(12) United States Patent
Brown et al.

(10) Patent No.: US 7,685,086 B2
(45) Date of Patent: Mar. 23, 2010

(54) METHOD FOR DISCOVERING UNDECLARED AND FUZZY RULES IN DATABASES

(75) Inventors: Paul Geoffrey Brown, San Jose, CA (US); Peter Jay Haas, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 11/842,828

(22) Filed: Aug. 21, 2007

(65) Prior Publication Data

US 2008/0027907 A1    Jan. 31, 2008

Related U.S. Application Data

(63) Continuation of application No. 10/697,052, filed on Oct. 31, 2003, now Pat. No. 7,277,873.

(51) Int. Cl.
*G06F 17/00* (2006.01)
*G06F 5/00* (2006.01)
*G06N 5/02* (2006.01)
*G06N 7/00* (2006.01)
*G06N 7/08* (2006.01)

(52) U.S. Cl. .............................. 706/45; 706/46; 706/50; 706/59

(58) Field of Classification Search ........................ None
See application file for complete search history.

(56) References Cited

U.S. PATENT DOCUMENTS 5,842,200 A    11/1998    Agrawal et al.
5,943,667 A    8/1999    Agrawal et al.
6,061,682 A    5/2000    Agrawal et al.
6,236,982 B1    5/2001    Mahajan et al.
6,272,478 B1    8/2001    Obata et al.

(Continued)

FOREIGN PATENT DOCUMENTS

JP    2001-344259    12/2001

OTHER PUBLICATIONS

'Interactive Data Analysis: The control project:' Hellerstein, 1999, IEEE, 0018-9162, pp. 51-59.*

(Continued)

*Primary Examiner*—David R Vincent
*Assistant Examiner*—Peter Coughlan
(74) *Attorney, Agent, or Firm*—IP Authority, LLC; Ramraj Soundararajan; Brian Lambert

(57) ABSTRACT

A scheme is used to automatically discover algebraic constraints between pairs of columns in relational data. The constraints may be "fuzzy" in that they hold for most, but not all, of the records, and the columns may be in the same table or different tables. The scheme first identifies candidate sets of column value pairs that are likely to satisfy an algebraic constraint. For each candidate, the scheme constructs algebraic constraints by applying statistical histogramming, segmentation, or clustering techniques to samples of column values. In query-optimization mode, the scheme automatically partitions the data into normal and exception records. During subsequent query processing, queries can be modified to incorporate the constraints; the optimizer uses the constraints to identify new, more efficient access paths. The results are then combined with the results of executing the original query against the (small) set of exception records.

3 Claims, 6 Drawing Sheets

U.S. PATENT DOCUMENTS

| | | | |
|---|---|---|---|
| 6,278,998 | B1 | 8/2001 | Ozden et al. |
| 6,385,608 | B1 | 5/2002 | Mitsuishi et al. |
| 6,415,287 | B1 | 7/2002 | Wang et al. |
| 2002/0198877 | A1 | 12/2002 | Wolff et al. |
| 2003/0023612 | A1 | 1/2003 | Carlbom et al. |

OTHER PUBLICATIONS

Paul Brown et al., "ARAM: Automatic Discovery of Fuzzy Algebraic Constraints in Relational Data," IBM Almaden Research Center, Paper No. 302, 12pgs.

Paul Brown et al., "BHUNT: Automatic Discovery of Fuzzy Algebraic Constraints in Relational Data," *Proceedings of the 29th VLDB Conference*, Berlin, Germany, 2003, 12pgs.

Anna Manning et al., "Data Allocation Algorithm for Parallel Association Rule Discovery," *Proceedings of the Advances in Knowledge Discovery and Data Mining, 5th Pacific-Asia Conference, PAKDD 2001*, Berlin, Germany, 2001, 6pgs.

Jarek Gryz et al., "Discovery and Application of Check Constraints in DB2," *17th International Conference on Data Engineering*, Apr. 2-6, 2001, Heidelberg, Germany, 5pgs.

Parke Godfrey et al., "Exploiting Constraint-Like Data Characterizations in Query Optimization," *ACM SIGMOD 2001*, May 21-24, 2001, Santa Barbara, California, 11pgs.

Bogdan Czejdo et al., "Materialized Views in Data Mining," *Proceedings of the 13th International Workshop on Database and Expert Systems Applications (DEXA '02)*, Sep. 2-6, 2002, Aix-en-Provence, France, 5pgs.

Ramakrishnam Srikant et al., "Mining Quantitative Association Rules in Large Relational Tables," *Proceedings of the 1996 ACM SIGMOD International Conference on Management of Data*, Montreal, Quebec, Canada, 1996, 12pgs.

Pauray Tsai et al., "Mining Quantitative Association Rules in a Large Database of Sales Transactions," *Journal of Information Science and Engineering*, 2001, pp. 667-681.

Chang-Hung Lee et al., "On Mining General Temporal Association Rules in a Publication Database," *Proceedings of the IEEE International Conference on Data Mining*, San Jose, California, Nov. 29-Dec. 2, 2001, pp. 337-344.

Patrick Bose et al., "On Some Fuzzy Extensions of Association Rules," *Joint 9th IFSA World Congress and 20th NAFIPS International Conference*, Vancouver, BC, Canada, Jul. 25-28, 2001, pp. 1104-1109.

\* cited by examiner

METHOD FOR DISCOVERING UNDECLARED AND FUZZY RULES IN DATABASES

RELATED APPLICATIONS

This application is a continuation of U.S. application Ser. No. 10/697,052, filed Oct. 31, 2003 now U.S. Pat. No. 7,277,873.

BACKGROUND OF THE INVENTION

1. Field of Invention

The present invention relates generally to the field of databases. More specifically, the present invention is related to an algorithm to automatically identify algebraic constraints between pairs of columns in relational data.

2. Discussion of Prior Art

Commercial DBMS vendors increasingly view autonomic and self-managing technologies as crucial for maintaining the usability and decreasing the ownership costs of their systems. Self-tuning database systems have also been receiving renewed attention from the research community (see, for example, the paper by Weikum et al. entitled, "Self-tuning database technology and information services: from wishful thinking to viable engineering", and references therein). Query optimizers that actively learn about relationships in the data are an important component of this emerging technology.

Previous work on automatic methods for learning about data relationships can be categorized according to whether the learning technique is query- or data-driven, and according to the type of information discovered. Query-driven techniques have the property that the mined information is, by definition, directly relevant to the user's needs and interests. This narrowed focus often leads to high accuracy. On the other hand, query-driven techniques can result in poor performance during the "warm-up" stage of query processing in which not enough queries have been seen yet. Similar problems arise when the workload starts to change, or when processing a query that is unlike any query previously seen. Indeed, use of query-driven techniques can cause a learning optimizer to "careen towards ignorance" by preferring query plans about which less is known, even if the plans are actually quite inefficient. The reason for this preference is that, in the absence of solid information, an optimizer usually underestimates the cost of a plan, for example, by making unrealistic independence assumptions. Data-driven techniques, though often less precise, complement query-driven techniques and can ameliorate their shortcomings.

One useful type of information about relationships in data is the multidimensional distribution of a set of attributes. A variety of data-driven techniques have been developed for producing "synopses" that capture such distributions in a compressed form; (see, for example, the following papers/reports and references therein: (a) Barbara et al. in report entitled, "The New Jersey data reduction report"; (b) Deshpande et al. in the paper entitled, "Independence is good: Dependency-based histogram synopses for high-dimensional data"; (c) Garofalakis et al. in the paper entitled, "Wavelet synopses with error guarantees"; and (d) Poosala et al. in the paper entitled, "Selectivity estimation without the attribute value independence assumption"). These methods are based on a scan or sample of the database, which can be initiated by the user or by the system. The methods have somewhat less of an autonomic feel than query-driven methods, because typically the user must specify which attributes to include in each synopsis. Also, methods for maintaining and exploiting synopses are typically expensive and complicated and therefore are hard to implement in commercial database systems.

A number of researchers have provided methods for maintaining useful statistics on intermediate query results such as partial joins. The LEO learning optimizer, for example, improves cardinality estimates for intermediate results by observing the data returned by user queries (see paper by Stillger entitled, "LEO-DB2's LEaring Optimizer"). Techniques proposed by Bruno and Chaudhuri (see paper by Bruno et al., "Exploiting statistics on query expressions for optimization") determine the "most important" statistics on intermediate query expressions (SITs) to maintain based on a workload analysis.

The information provided by the foregoing techniques is used by the optimizer to improve the cost estimates of the various access plans under consideration. An alternative set of techniques provides information to the optimizer in the form of rules or constraints. The optimizer can directly use such information to consider alternative access paths. Important types of constraints include functional dependencies, multi-valued dependencies, and semantic integrity constraints.

Two columns $a_1$ and $a_2$ of categorical data obey a functional dependency if the value of $a_1$ determines the value of $a_2$. A typical example of a functional dependency occurs when $a_1$ contains car models and $a_2$ contains car makes. For example, a car model value of Camry implies a car make value of Toyota. A multi-valued dependency is a generalization of a functional dependency that in effect provides a necessary and sufficient condition under which a relation can be decomposed into smaller normalized relations. Mining of functional and multi-valued dependencies is discussed in various papers (see the following papers: (a) the paper by Bell et al. entitled, "Discovery of constraints and data dependencies in databases"; (b) the paper by Huhtala et al. entitled, "TANE: An efficient algorithm for discovering functional and approximate dependencies"; (c) the paper by Petitet al. entitled, "Towards the reverse engineering of denormalized relational databases"; and (d) the paper by Wong et al. entitled, "Automated database schema design using mined data dependencies").

Semantic integrity constraints arise in the setting of semantic query optimization. For example, Siegel et al. in the paper entitled, "A method for automatic rule derivation to support semantic query optimization" and Yu et al. in the paper entitled, "Automatic knowledge acquisition and maintenance for semantic query optimization", consider query-driven approaches for discovering constraints of the form A→B and JC→(A→B), where JC is a join condition, and A→B is a rule such as s.city=chicago→t.weight>200.

The above-mentioned prior art techniques are closely related to techniques used in reverse engineering and discovery of entity-relationship (ER) models for legacy databases (see, for example, the following papers and references therein: the paper by Bell et al. entitled, "Discovery of constraints and data dependencies in databases" and the paper by Petit et al. entitled, "Towards the reverse engineering of denormalized relational databases"). Many of these algorithms rely on information contained in the schema definition—such as primary-key declarations—or in a set of workload queries. Algorithms such as those described in Bell et al. and Petit et al. execute a sequence of queries involving joins and COUNT(DISTINCT) operations to discover inclusion dependencies—an inclusion dependency exists between columns $a_1$ and $a_2$ if every value that appears in $a_2$ also appears in $a_1$.

The following patents/references provide for a general teaching in the area of data mining, but they fail to provide for the limitations of the present invention's method.

The U.S. patent publication to Carlbom et al. (US 2003/0023612) discloses a system performing data mining based upon real-time analysis of sensor data. The performance data mining system combines detailed sensor analysis data with other data sources to discover interesting patterns/rules for performance and utilizes real time sensor analysis to dynamically derive mining results in real time during an event. The system described in Carlbom et al. automatically generates advice/strategy and predictions based on specified criteria.

The U.S. patent publication to Wolff et al. (2002/0198877) provides for a method for mining association rules in a database that is divided into multiple partitions associated with respective computer nodes. The method of Wolff et al. includes transmitting messages among the nodes with respect to local support of an itemset in the respective partitions of the database. Responsive to the messages transmitted by a subset of the nodes, the itemset is determined to be globally frequent in the database before the nodes outside the subset have transmitted the messages with respect to the local support of the itemset in their respective partitions. An association rule is computed with respect to the itemset, responsive to having determined the itemset to be globally frequent.

The U.S. patent to Wang et al. (U.S. Pat. No. 6,415,287) provides for a method and system for mining weighted association rule. Wang et al. extend the traditional association rule problem by allowing a weight to be associate with each item in a transaction to reflect interest/intensity of each item within the transaction. The weighted association rules from a set of tuple lists are discovered, where each tuple consists of an item and an associated weight and each tuple list consists of multiple tuples.

The U.S. patent to Mitsubishi et al. (U.S. Pat. No. 6,385,608) discloses a method and apparatus for discovering association rules. A candidate-itemset generating unit generates a candidate-itemset composed of at least one candidate item to be included in the left hand side or the right hand side of the association rule. A candidate-itemset verifying unit selects itemsets having frequencies (appearing times in the database) more than the minimum frequency out of the candidate-itemsets, as large-itemsets. A candidate rule generating unit generates candidate association rules based on a large-itemset of k−1 long and a large-itemset of 1 long. A chi-square testing unit generates an association rule set based on the candidate association rules.

The U.S. patent to Ozden et al. (U.S. Pat. No. 6,278,998) discloses a system and method for discovering association rules that display regular cyclic variation over time. Such association rules may apply over daily, weekly or monthly (or other) cycles of sales data or the like. A first technique, referred to as the sequential algorithm, treats association rules and cycles relatively independently. Based on the interaction between association rules and time, Ozden employs a technique called cycle pruning, which reduces the amount of time needed to find cyclic association rules. A second technique, referred to as the interleaved algorithm, uses cycle pruning and other optimization techniques for discovering cyclic association rules with reduced overhead.

The U.S. patent to Mahajan et al. (U.S. Pat. No. 6,236,982) discloses a method that uses calendars to describe the variation of association rules over time, where a specific calendar is defined as a collection of time intervals describing the same phenomenon.

The U.S. patent to Aggarwal et al. (U.S. Pat. No. 5,943,667) discloses a computer method for removing simple and strict redundant association rules generated from large collections of data. The U.S. Pat. No. 6,061,682, to Agrawal et al., provides for a method and apparatus for mining association rules having item constraints. The U.S. Pat. No. 5,842,200, also to Agrawal et al., provides for a system and method for parallel mining of association rules in database.

The Japanese patent to Shigeru et al. (JP 2001-344259) provides for an incremental mining method which increases the data mining speed at the time of data addition or deletion.

The paper by Czejdo et al., entitled "Materialized views in data mining," discloses the use of materialized views in the domains of association rules discovery and sequential pattern search.

The paper by Lee et al. entitled, "On Mining General Temporal Association Rules in a Publication Database," discloses a progressive partition miner, wherein the cumulative information of mining previous partitions is selectively carried over toward the generation of candidate itemsets for the subsequent partitions.

The paper by Bosc et al. entitled, "On some fuzzy extensions of association rules," discloses the semantics of two fuzzy extensions of the classical concept of an association rule.

The paper by Manning et al. entitled, "Data allocation algorithm for parallel association rule discovery," discloses an algorithm that uses principal component analysis to improve data distribution prior to fast parallel mining.

The paper by Srikant et al. entitled, "Mining quantitative association rules in large relational tables," discloses techniques for mining in large relation tables containing both quantitative and categorical attributes.

The paper by Tsai et al. entitled, "Mining quantitative association rules in a large database of sales transactions," discloses partition algorithms for partitioning data and a scheme to discover all the large itemsets from the partitioned data.

The paper by Godfrey et al. entitled, "Exploiting Constraint-Like Data Characterizations in Query Optimization," discloses advantages of optimizing queries in a database like DB2 given a set of integrity constraints. The paper by Gryz et al. entitled, "Discovery and Application of Check Constraints in DB2," discloses advantages of identifying regularities in data stored in a database such as DB2.

Whatever the precise merits, features, and advantages of the above cited references, none of them achieves or fulfills the purposes of the present invention.

SUMMARY OF THE INVENTION

The present invention provides for a method for discovering undeclared and fuzzy rules in a database. The method, in one embodiment, comprises the steps of: (a) identifying candidates of form $C=(a_1, a_2, P, \oplus)$ by finding declared or undeclared key columns and columns related to the declared and undeclared key columns via an inclusion dependency, wherein $a_1$ and $a_2$ are numerical attributes associated with column values of data in the database, P is a pairing rule, and $\oplus$ is an algebraic operator; (b) for each candidate in (a), identifying a sample set and constructing an algebraic constraint $AC=(a_1, a_2, P, \oplus, I_1, \ldots, I_k)$ for the sample set by applying any of, or a combination of the following techniques: statistical histogramming, segmentation, or clustering techniques, wherein the sample size is selected to control the number of exception records that fail to satisfy the algebraic constraint; (c) identifying a set of useful constraints and associated exception tables via heuristics comprising pruning rules and creating exception tables to hold the exception records; and (d) during query processing, modifying queries to incorporate the identified algebraic constraints with an optimizer utilizing the identified algebraic constraints to identify new, more efficient access paths.

The present invention provides for a method that automatically discovers algebraic relationships between attributes and provides this information to, for example, an optimizer in the form of constraint predicates, along with an estimate of the predicates' selectivity. In this scenario, an optimizer is able to utilize this information to improve cost estimates. Also, knowledge of the discovered predicates provides new access plans for the optimizer's consideration, wherein the new access paths lead to substantial speedups in query processing. Such predicates also allow the database administrator (DBA) to consider alternative physical organizations of the data, such as the creation of materialized views and/or indexes, or the use of alternative partitioning strategies. Furthermore, the predicates may be of interest in their own right, providing new insights into application data. In an extended embodiment, the present invention's system and method are extended to discover other relationships, such as fuzzy functional dependencies.

DESCRIPTION OF THE PREFERRED EMBODIMENTS

Figure 1:
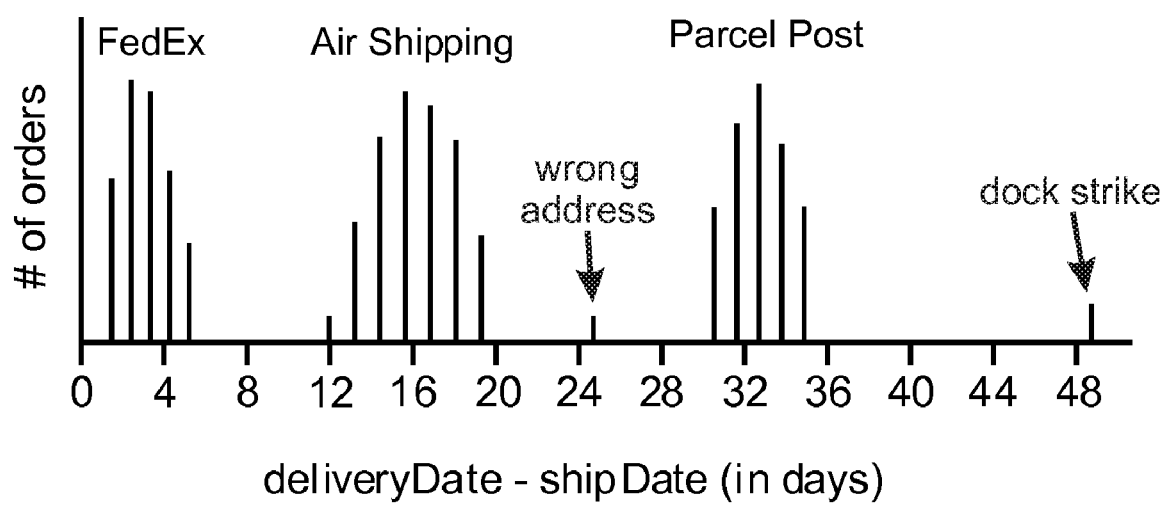
FIG. 1 illustrates a histogram of shipping delays.

While this invention is illustrated and described in a preferred embodiment, the invention may be implemented in many different variations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The present invention provides for a method that automatically discovers algebraic relationships between attributes and provides this information to, for example, an optimizer in the form of constraint predicates, along with an estimate of the predicates' selectivity. To help better illustrate the functionality and advantages associated with the present invention, a few examples are provided below.

EXAMPLE 1

Consider a hypothetical sales database that contains tables orders and deliveries as in Tables 1 and 2 (provided below), and suppose that the database contains many year's worth of data.

TABLE 1

Orders

| orderID | shipDate |
|---------|------------|
| 2A5 | 2001-01-03 |
| 3C2 | 2001-04-15 |
| 3B8 | 2002-11-25 |
| 2E1 | 2002-10-31 |
| 3D6 | 2002-07-25 |
| ... | ... |

TABLE 2

Deliveries

| orderID | deliveryDate | deliveryTime |
|---------|--------------|--------------|
| 2A5 | 2001-01-06 | 09:50 |
| 3C2 | 2001-04-27 | 13:00 |
| 3B8 | 2002-12-10 | 11:20 |
| 2E1 | 2002-12-02 | 16:10 |
| 3D6 | 2002-07-29 | 08:50 |
| ... | ... | ... |

A casual inspection of the columns orders.shipDate and deliveries.deliveryDate may not reveal any meaningful relationships, but if the following SQL query is executed

```
SELECT DAYS(deliveries.deliveryDate)
       - DAYS(orders.shipDate)
FROM orders, deliveries
WHERE orders.orderID = deliveries.orderID
``` with the resulting data points being plotted as a histogram, a plot as in FIG. 1 is obtained. It is seen from FIG. 1 that, except for a small number of outlier points, the data satisfy the predicate:

$$
\begin{aligned}
&\text{(deliveryDate BETWEEN shipDate + 2 DAYS} \\
&\quad \text{AND shipDate + 5 DAYS)} \\
&\text{OR (deliveryDate BETWEEN shipDate + 12 DAYS} \\
&\quad \text{AND shipDate + 19 DAYS)} \\
&\text{OR (deliveryDate BETWEEN shipDate + 31 DAYS} \\
&\quad \text{AND shipDate + 35 DAYS)}
\end{aligned} \quad (1)
$$

The three clauses in the predicate—equivalently, the three "bumps" in the histogram of FIG. 1—correspond to three shipping methods. Knowledge of this predicate can help an optimizer choose an efficient method for joining the orders and deliveries tables. For example, consider the query:

```
SELECT COUNT(*)
FROM orders, deliveries
WHERE orders.shipDate BETWEEN '2003-07-01'
      AND '2003-07-05'
AND deliveries.deliveryTime > '17:00'
AND orders.orderID = deliveries.orderID
```

Suppose that there exist indexes on columns orders.orderID, deliveries.orderID, and deliveries.deliveryDate, but not on orders.shipDate. Combining the predicate in the foregoing query with the predicate in (1), the following new local predicate is obtained for the deliveries table:

(deliveryDate BETWEEN '2003-07-01' + 2 DAYS
    AND '2003-07-05' + 5 DAYS)
OR
(deliveryDate BETWEEN '2003-07-01' + 12 DAYS
    AND '2003-07-05' + 19 DAYS)     (2)
OR
(deliveryDate BETWEEN '2003-07-01'  +  31 DAYS
    AND '2003-07-05' + 35 DAYS)

One possible access plan first uses the index on deliveries.deliveryDate to efficiently apply both the predicate in (2) and the predicate on deliveries.deliveryTime to the deliveries table. Then, for each qualifying row, the plan uses the index on orders.orderID to find the matching record in the orders table and apply the original predicate on orders.shipDate. It should be noted that this access plan is not available to the optimizer without knowledge of the predicate in (1). Because the number of qualifying rows from the deliveries table is small, this access plan is relatively efficient. Moreover, the access plan that utilizes the predicate in (1) is clearly more efficient than the plan that first applies the predicate on orders.shipDate and then joins each qualifying row with its matching row from the deliveries table.

EXAMPLE 2

Consider the example of the Section 1, with the deliveryDate column located in the orders table, as shown in Table 3 below.

TABLE 3

Alternate version of orders table

| orderID | shipDate | deliveryDate |
|---------|----------|--------------|
| 2A5 | 2001-01-03 | 2001-01-06 |
| 3C2 | 2001-04-15 | 2001-04-27 |
| 3B8 | 2002-11-25 | 2002-12-10 |
| 2E1 | 2002-10-31 | 2002-12-02 |
| 3D6 | 2002-07-25 | 2002-07-29 |
| ... | ... | ... |

The orders table is horizontally range-partitioned on deliveryDate across a number of parallel processing nodes. Now, lets consider the following query:

SELECT COUNT(*)
FROM orders
WHERE orders.shipDate = '2003-07-01'

Using the information derived from the predicate in (1), the following predicate can be derived:

deliveryDate BETWEEN '2003-07-01'  +  2 DAYS
    AND '2003-07-01' + 5 DAYS
OR
deliveryDate BETWEEN '2003-07-01'  +  12 DAYS -continued AND '2003-07-01' + 19 DAYS     (3)
OR
deliveryDate BETWEEN '2003-07-01'  +  31 DAYS
    AND '2003-07-01' + 35 DAYS.

An optimizer is able to exploit this information to speed up processing by identifying those partitions that potentially contain rows satisfying the predicate in (3), and hence satisfying the original query. Processing is then restricted to the identified partitions.

The predicate in (1) asserts an algebraic relationship between a pair of columns. In general, an algebraic relationship on numerical attributes $a_1$ and $a_2$ has the mathematical form:

$$a_1 \oplus a_2 \in I,  \quad (4)$$

where $\oplus$ is an algebraic operator, i.e., $+$, $-$, $\times$, or $/$, and I is a subset of the real numbers. To completely specify the relationship, an identification is made with regards to which particular $a_1$ values get paired with which particular $a_2$ values to form the set of number pairs acted on by the $\oplus$ operator. This is done by specifying a pairing rule P. In the simplest case, the columns lie in the same table R and each $a_1$ value is paired with the $a_2$ value in the same row. The pairing rule is then trivial, and it is denoted it by the symbol $\emptyset_R$. When the columns lie in tables R and S, then P is simply a two table join predicate that is satisfied for each pair of tuples (r, s) such that (r.$a_1$, s.$a_2$) is one of the number pairs acted on by $\oplus$. Tables R and S are allowed to coincide, so that P is a self-join predicate. In general, there can be more than one pairing rule between two specified columns, and multiple pairs ($a_1$, $a_2$) can share the same pairing rule. An example of the former situation occurs when two columns are in the same table and specific column values are paired if they occur in the same row or are paired if they appear in different rows that are related via a self-join predicate. An example of the latter situation occurs when P represents a join between tables R and S, and an algebraic relationship exists both between R.$a_1$ and S.$a_2$ and between R.$b_1$ and S.$b_2$.

Hence, an algebraic constraint is specified as a 5-tuple:

$$AC=(a_1,a_2,P,\oplus,I),$$

where $a_1$, $a_2$, $\oplus$, and I are as in (4) and P is a pairing rule. For example, the algebraic constraint in Example 1 is specified by taking $a_1$ as deliveries.deliveryDate, $a_2$ as orders.shipDate, $\oplus$ as the subtraction operator, P as the join predicate orders.orderID=deliveries.orderID, and $I=\{2,3,4,5\} \cup \{12,13,\ldots,19\} \cup \{31,32,33,34,35\}$.

The algebraic constraint in Example 2 is specified almost identically, except that now $a_1$ is taken as orders.deliveryDate and P as the trivial pairing rule $\emptyset_{orders}$.

Considering the case in which $I=I_1 \cup \ldots \cup I_k$ for some $k \geq 1$, it is seen that the sets in the union are mutually disjoint and either each $i_j$ is an interval of the real line or each $I_j$ is an interval of the integers. Thus, focus is placed on algebraic constraints that correspond to disjunctive range predicates. In this case, the algebraic constraint is written as:

$$AC=(a_1,a_2,P,\oplus,I_1,\ldots,I_k).$$

Useful algebraic constraints abound in real-world data sets, but are often hidden from the DBMS for one of the following reasons:

- The constraint is inherent to the problem domain but unknown to both the application developer and the DBA.
- The constraint is enforced by the application that uses the DBMS and not by the DBMS itself.
- The DBA knows about the constraint but chooses not to enforce it for reasons of cost.
- The constraint is fuzzy in that most, but not all, of the data satisfy the constraint.

Figure 2:
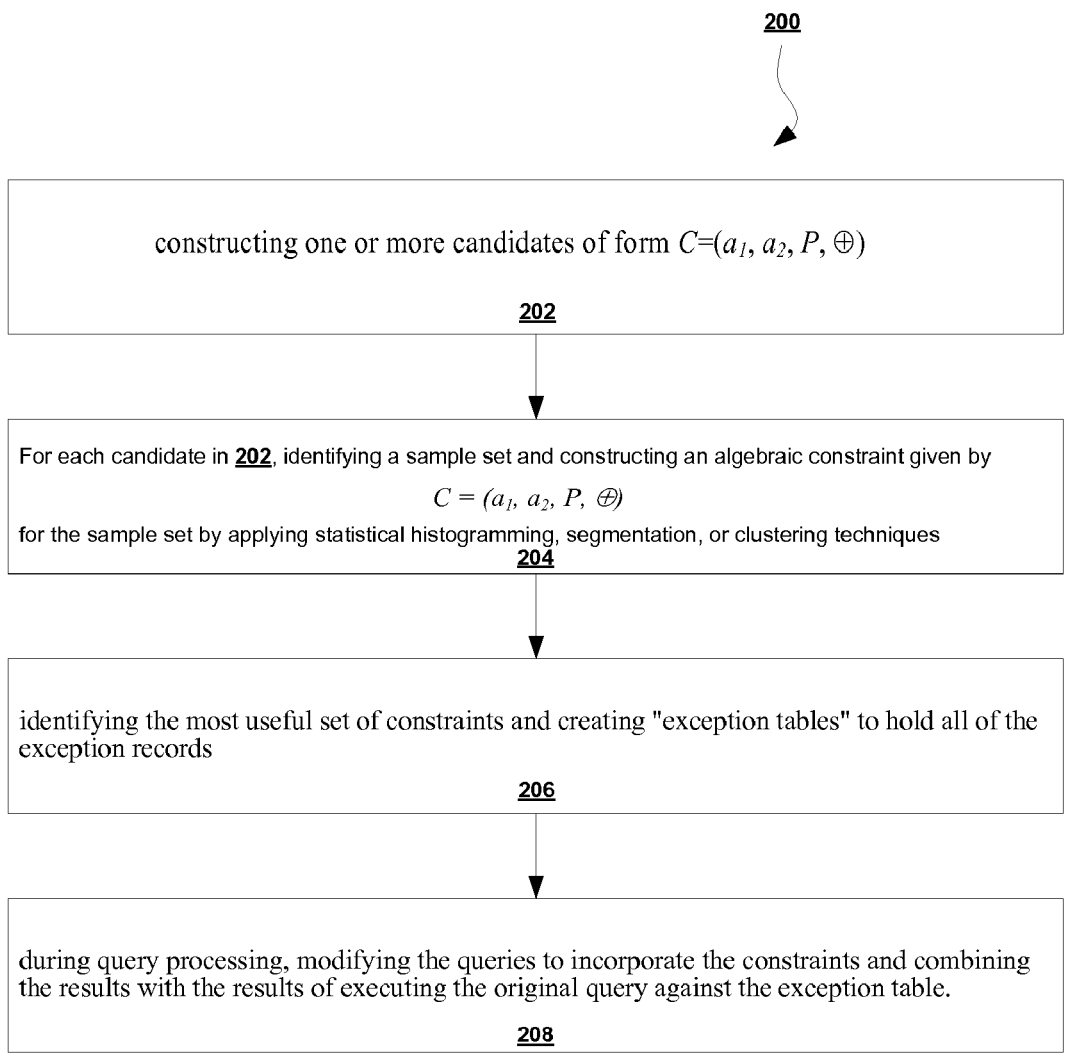
FIG. 2 illustrates an exemplary embodiment associated with the present invention's method.

FIG. 2 illustrates an embodiment of the present invention's scheme 200 (also called BHUNT for "Bump HUNTer") for automatically and efficiently finds and exploits hidden, fuzzy algebraic constraints. In this embodiment, the scheme proceeds by executing the following steps:

1. Find candidates of the form $C=(a_1, a_2, P, \oplus)$—step 202. This process involves, among other things, finding declared or undeclared key columns and then finding columns related to the key columns via an inclusion dependency.
2. For each candidate, construct the algebraic constraint (i.e., construct the intervals $I_1, I_2, \ldots, I_k$) by applying statistical histogramming, segmentation, or clustering techniques to a sample of the column values—step 204. The sample size is selected to control the number of "exception" records that fail to satisfy the constraint.
3. Identify the most useful set of constraints, and create "exception tables" to hold all of the exception records—step 206.
4. During query processing, modify the queries to incorporate the constraints—the optimizer uses the constraints to identify new, more efficient access paths. Then combine the results with the results of executing the original query against the (small) exception table—step 208.

It should be noted that steps 1 and 2 are executed in preferred embodiment. Steps 3 and 4 are executed whenever the present invention's scheme is used for query optimization. In this latter setting, Steps 1-3 are executed prior to query processing in much the same way as statistics collection utilities are invoked in order to populate the system catalog. Step 4 is executed either when a query is compiled or run. The present invention's scheme (BHUNT) is flexible in that it does not require any particular physical organization of the data, and is autonomic in that it does not require any user intervention. For BHUNT to provide a net benefit, it is crucial that the preceding steps be executed as efficiently as possible. BHUNT will typically be applied to databases comprising many tables with many columns in each table. Because the number of candidate column pairs can grow quadratically with the total number of columns, inexpensive candidate pruning heuristics are key to efficient execution. BHUNT also depends heavily on modern DBMS query sampling and parallel processing technology to deal with the massive amounts of data typically found in modern warehouses. Other key elements of the BHUNT scheme include data mining and statistical techniques for identifying the algebraic constraints, and query optimization methods for exploiting the discovered constraints during query processing.

The first step in the BHUNT scheme is to generate candidates of the form $C=(a_1, a_2, P, \oplus)$. Such a candidate corresponds to the set of numbers $$\Omega_C = \{r.a_1 \oplus r.a_2 : r \in R\}$$

when the pairing rule P is a trivial rule $\emptyset_R$ and $$\Omega_C = \{r.a_1 \oplus s.a_2 : r \in R, s \in S, \text{ and } (r,s) \text{ satisfies } P\},$$

when P is a join predicate between tables R and S. Parameter $\Omega_C$ is the induced set for C. In Examples 1 and 2, it is the points in $\Omega_C$ that are histogrammed in FIG. 1. The user is able to specify a set $O \subseteq \{+, -, \times, /\}$ of allowable algebraic operators.

There is a tension between the desire to be as thorough as possible in identifying candidates and the desire to be as efficient as possible by not examining too many candidates. BHUNT deals with this tension by combining a thorough search strategy with the continual use of pruning heuristics. The precise set of heuristics is flexible and depends on the goal of the BHUNT analysis. For example, BHUNT can be used for query optimization or for mining; a user would likely employ a more stringent set of heuristics for the former purpose than for the latter.

BHUNT proceeds by first generating a set $\mathcal{P}$ of pairing rules. For each pairing rule $P \in \mathcal{P}$ BHUNT systematically considers possible attribute pairs $(a_1, a_2)$ and operators $\oplus$ with which to construct candidates. At each stage of the process, the pruning heuristics alluded to above are used to keep the number of candidates under control.

BHUNT initializes $\mathcal{P}$ to be the empty set and then adds a trivial pairing rule of the form $\emptyset_R$ for each table R in the database schema. The present invention's scheme can search for algebraic constraints over multiple schemas by simply dealing with the union of schemas. BHUNT then generates nontrivial pairing rules.

The main heuristic underlying the generation of the nontrivial pairing rules is that they should "look like" key-to-foreign-key join predicates, since such joins are the most common type encountered in practice. Specifically, BHUNT first generates a set K of "key-like" columns from among all of the columns in the schema. For each column $a \in K$, BHUNT then tries to identify suitable "foreign-key-like" matching columns from among all of the columns in the schema. That is, BHUNT tries to find all columns related to column a via an inclusion dependency. If n (>0) such columns $b^{(1)}, b^{(2)}, \ldots, b^{(n)}$ are found, then BHUNT adds the pairing rules $P_1, P_2, \ldots, P_n$ to $\mathcal{P}$, where $P_i$ denotes the predicate "$a=b^{(i)}$" for $1 \leq i \leq n$.

The columns in K comprise all of the declared primary key columns, all of declared unique key columns, and any column a not of these two types such that $$\frac{\#\,rows(a)}{\#\,distinctValues(a)} \leq 1 + \varepsilon$$

The latter type of column is called an undeclared key. Here $\varepsilon$ is a pre-specified parameter of BHUNT and the quantities #rows(a) and #distinctValues(a) are obtained from the system catalog. BHUNT additionally requires that the data type of each column in K belong to a user-specified set T of types, where each type in T is suitable for use in equality predicates (e.g., not floating point or BLOB data).

Given a column a∈K, BHUNT examines every other column in the schema to find potential matches. A column b is considered a match for column a if the following conditions hold:
1. The data in columns a and b are of a comparable type.
2. Either
   (a) column a is a declared primary key and column b is a declared foreign key for the primary key, or
   (b) every data value in a sample from column b has a matching value in column a.

The sample used to check the condition in 2(b) need not be large. For example, in an example implementation, the sample size can be set at a few hundred rows.

BHUNT is also able to deal with the case in which a declared primary key or declared unique key in K is a compound key of the form $a=(a_1, \ldots, a_m) \in T^m$ for some m>1. In this case, given a compound key $(a_1, \ldots, a_m) \in K$, BHUNT considers as a match every compound attribute $b=(b_1, \ldots, b_m)$ such that columns $b_1, \ldots, b_m$ are in the same table and $type(a_1)=type(b_2)$ for $1 \leq i \leq m$. Then the conditions in 2(a) and 2(b) are checked to determine whether or not a matches b; of course, "column" now means "compound column," "match" now means "componentwise match," and the pairing rule is a predicate of the form:

$$a_1 = b_1^{(i)} \text{ AND } \ldots \text{ AND } a_m = b_m^{(i)}.$$

As discussed previously, BHUNT applies an adjustable set of pruning rules to limit the number of candidates. The goal of these heuristics is to restrict the set of candidates to those that are likely to generate useful algebraic constraints—a constraint is useful if it can be identified quickly, will arise frequently in practice, and will result in a significant performance improvement. The following set of heuristics is useful for pruning a pairing rule P to be useful in the context of query optimization. (For simplicity, the heuristics are described when the elements of K are simple, not compound, keys.)

Rule 1: P is of the form R.a=S.b or of the form $\emptyset_R$, and the number of rows in either R or S lies below a specified threshold value. The motivation for this rule is that only tables that are important to query performance are looked at. Maintaining exception tables over tables that are small initially is probably not a good use of resources. This rule is equivalent to restricting the scope of BHUNT to the M largest tables in the scheme as indicated by system catalog statistics, where M is specified by the user.

Rule 2: P is of the form R.a=S.b with a∈K, and the number of distinct values in S.b divided by the number of values in R.a lies below a specified threshold value. In practice, pairing rules that satisfy this condition are likely to be spurious.

Rule 3: P is of the form R.a=S.b, and one or both of R and S fails to have an index on any of its columns. This rule is checked when inserting columns into the set K and prior to identifying matches for an element of K. The idea is to preclude columns for which the computational cost of checking the inclusion condition in 2(b) above is high.

Rule 4: P is of the form R.a=S.b with a ∈K, and S.b is a system-generated key. In this case the pairing rule will be spurious.

For each pairing rule P generated as described above, BHUNT attempts to construct one or more candidates of the form $C=(a_1, a_2, P, \oplus)$. If P is a trivial rule of the form $\emptyset_R$ or is a nontrivial pairing rule that corresponds to a self join of table R, then BHUNT considers every pair of columns in the set $\{(a_1, a_2):a_1, a_2 \in A(R) \text{ and } a_1 \neq a_2\}$. Here A(R) denotes the set of columns (i.e., attributes) of R. If P is a nontrivial pairing rule that corresponds to a join of distinct tables R and S, then BHUNT considers every pair $\{(a_1, a_2):a_1, a_2 \in A(R) \text{ and } a_2 \in A(s)\}$. Each pair $(a_1, a_2)$ is considered in conjunction with the set of possible operators in the user-specified set O. A triple $(a_1, a_2, \oplus)$ is combined with the pairing rule P to form a candidate $C=(a_1, a_2, P, \oplus)$ if the following conditions hold:
1. $a_1$ and $a_2$ can be operated on by $\oplus$. For example, $a_1$ and $a_2$ are float or integer types and $\oplus \in O$, or they are both date types and $\oplus \in \{+,-\}$ (since date types cannot be multiplied or divided).
2. If the pairing rule P is nontrivial, then $a_1$ and $a_2$ cannot correspond to the columns referred to in the pairing rule, since then $r.a_1 = s.a_2$ whenever r and s satisfy P, and any algebraic constraint based on the $(a_1, a_2)$ pairs will be useless.

In an extended embodiment, when generating pairing rules, additional heuristics are used to prune the final set of candidates. Examples of useful heuristic pruning rules include the following.

Rule 1: $a_1$ and $a_2$ are not of the exact same data type (casting is required).

Rule 2: The fraction of NULL values in either $a_1$ or $a_2$ exceeds a specified threshold. The idea is that even if each column has a sufficient number of rows (as in pairing-rule pruning heuristic), the effective number of rows may be small because of NULLs.

Rule 3: Either column $a_1$ or $a_2$ is not indexed. The reasoning here is that if there are no indexes, then the database designer probably did not consider columns $a_1$ and $a_2$ to be important for query processing performance, so an algebraic constraint based on these columns is not likely to be useful.

For each candidate $C=(a_1, a_2, P, \oplus)$ that has been generated using the techniques described above, BHUNT employs a sampling-based approach to construct a fuzzy algebraic constraint $AC=(a_1, a_2, P, \oplus, I_1, \ldots, I_k)$, where $k \geq 1$. Specifically, BHUNT takes a small sample $W_C$ of the induced set $\Omega_C$ and constructs a set of disjoint intervals $I_1, \ldots, I_k$ such that every point in $W_C$ falls within one of the intervals. The sample size is chosen so that with high probability the fraction of points in $\Omega_C$ that do not fall within one of the intervals lies below a specified threshold—this small fraction of points corresponds to the set of exception records. The $I_j$'s are referred to as "bump intervals" because they correspond to bumps in a histogram such as the one in FIG. 1. A description of how bump intervals are constructed from a sample is now provided.

Figure 3:
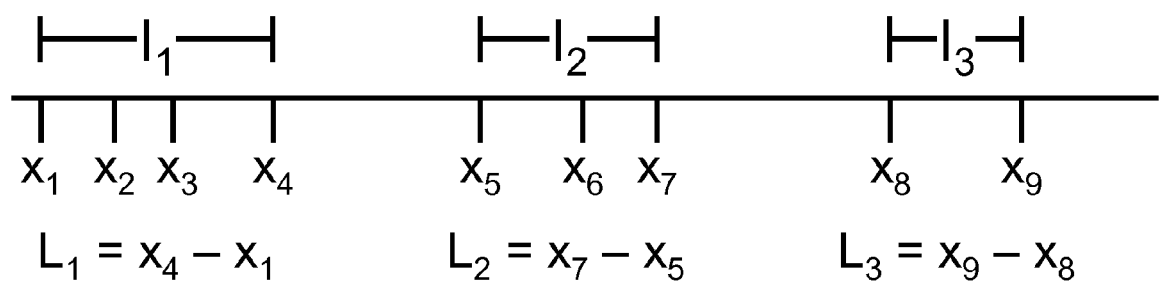
FIG. 3 illustrates the segmentation of points in a sampled set, $W_C$.

In one embodiment, BHUNT may use an optimal-segmentation approach to obtain the bump intervals. That is, BHUNT sorts the n data points in the sampled set $W_C$ in increasing order as $x_1 \leq x_2 \leq \ldots \leq x_n$, and then divides this sequence into disjoint segments. FIG. 3 illustrates the segmentation of points in $W_C$. A segmentation S can be specified as a vector of indices $(i(1), i(2), \ldots, i(k))$ that delineate the right endpoints of the segments. That is, the first segment is $x_1, x_2, \ldots, x_{i(1)}$, the second segment is $x_{i(1)+1}, x_{i(1)+2}, \ldots, x_{i(2)}$, and so forth—with $i(0)=0$ and $i(k)=n$. Such segmentation is also referred to as a k-segmentation in order to emphasize the number of segments. In terms of the foregoing notation, the $j^{th}$ bump interval $(1 \leq j \leq k)$ is given by $I_j=[x_{i(j-1)+1}, x_{i(j)}]$. In other words, the two data points that delineate the segment also delineate the endpoints of the bump interval (see FIG. 3). The length of $I_j$, denoted $L_j$, is therefore given by $L_j = x_{i(j)} - x_{i(j-1)+1}$. As discussed below, BHUNT may actually adjust the interval endpoints slightly.

The optimal-segmentation approach rests on the fact that there is typically a trade-off between the filtering power and complexity of an algebraic constraint predicate, where the filtering power is defined as the sum of the bump interval lengths divided by the range $\Delta = \max_{x \in \Omega_c} x - \min_{x \in \Omega_c} x$ of values for the points in $\Omega_C$. At one extreme, an algebraic constraint comprising many short bump intervals often leads to very selective query predicates that speed up query processing by cutting down on the number of accesses to the base tables. If the number of intervals becomes too large, however, processing times start to increase because the many OR clauses in the constraint become expensive to evaluate and, moreover, the query optimization process becomes more complex and hence time consuming. Ideally, BHUNT should choose a segmentation to minimize the overall cost. But, such tradeoffs cannot be precisely quantified.

BHUNT approximates the foregoing ideal but impractical approach by optimizing a weighted average of the number of bump intervals and the filtering power of the constraint. That is, for a segmentation $S=(i(1), i(2), \ldots, i(k))$, $c(S)$ is set as follows:

$$c(S) = wk + (1-w)\left[\frac{1}{\Delta}\sum_{j=1}^{k} L_j\right], \quad (5)$$

and a segmentation S is found that minimizes the function c. Here w is a fixed weight between 0 and 1. If w is close to 0 then the optimal segmentation will produce an algebraic constraint with many short intervals; if w is close to 1, then the constraint will comprise a small number of long intervals. The simplest approach to estimating the range $\Delta$ is to simply observe the sorted sampled data values $x_1, x_2, \ldots, x_n$ and set $\Delta = x_n - x_1$. The resulting estimate will be low however. A more complicated approach is as follows. Lets consider the example wherein the candidate $C=(a_1, a_2, P, \oplus)$, operator $\oplus$ is the division operator, and all data values are positive. Additionally, let $a_1^M$ and $a_1^m$ be the maximum and minimum values in column $a_1$, and similarly define $a_2^M$ and $a_2^m$; such parameters (or approximations thereof) can either be obtained from the system catalog or estimated by using the maximum and minimum $a_1$ and $a_2$ values in the sample. Then $\Delta$ is estimated as a function of $a_1^m$, $a_1^M$, $a_2^m$, and $a_2^M$ (e.g., $\Delta$ can be estimated as $$\Delta \approx \left(\frac{a_1^M}{a_2^m}\right) - \left(\frac{a_1^m}{a_2^M}\right)\right).$$

In any case, once w and $\Delta$ are fixed, an optimal segmentation can be easily determined using the following result.

Theorem 1—Let c be defined as in (5). Then a segmentation that minimizes c is defined by placing adjacent points $x_l$ and $x_{l+1}$ in the same segment if and only if $x_{l+1} - x_l < d^*$, where $d^* = \Delta(w/(1-w))$.

When dealing with discrete data types such as DAY or INTEGER, BHUNT actually uses the value $\max(d^*, 1+\epsilon)$ for segmentation, where $\epsilon$ is a small positive constant.

In an alternative embodiment, BHUNT may segment the values in $W_C$ to identify "natural" clusters of the points, using any of the many well known clustering techniques available (see book by Hastie et al. entitled, "The elements of statistical learning: data mining, Inference, and Prediction"). In this context, the "gap statistic" described in the paper by Tibshirani et al. (entitled, "Estimating the number of clusters in a data set via the gap statistic") may be used to choose the number of segments. It should be noted that the drawback of such an approach is the high computational costs involved—since BHUNT generates many candidate algebraic constraints, it is important to keep the cost of computing each constraint very low.

Figure 4:
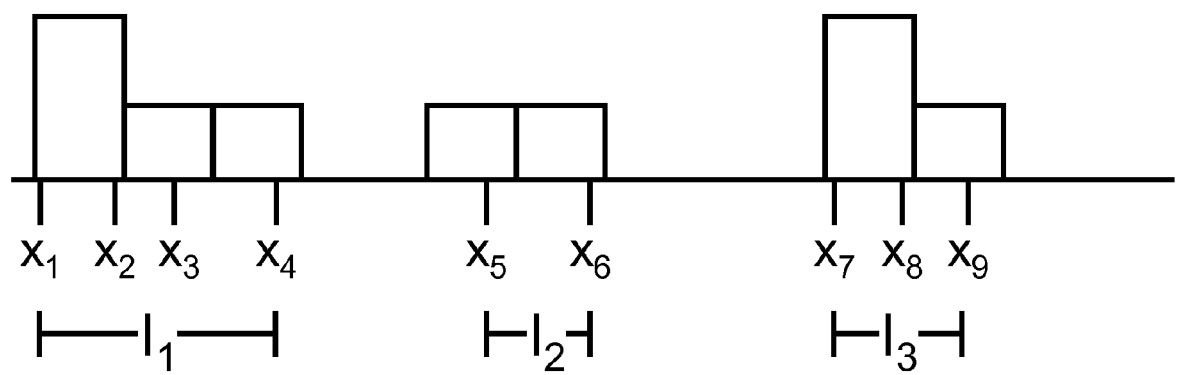
FIG. 4 illustrates the histogramming method of segmentation.

One inexpensive natural clustering method that has worked well in experiments is based on a histogramming approach. The idea is for BHUNT to construct a histogram using an appropriate bucket width. Adjacent nonempty buckets are then merged to form an initial set of bump intervals, and then each of these intervals is trimmed if necessary so that the interval endpoints each coincide with one of the $x_i$'s; see FIG. 4. As described in the book by D. W. Scott entitled, "Multivariate Density Estimation: Theory, Practice, and Visualization," $2h(n)$ buckets are used when $h(n)=(2n)^{1/3}$ is the "oversmoothing" lower bound. Use of this number of buckets approximately minimizes the "asymptotic mean integrated squared error" of the histogram when the histogram is viewed as an estimator of the underlying density function of the data. Other methods (such as those described in the paper by Hall et al. entitled, "On stochastic complexity and nonparametric density estimation") can be used to determine the number of buckets, but at a significantly higher cost. If the histogramming method creates a segment consisting of a single point, then BHUNT adds to the algebraic constraint a bump interval centered around the data point and having a width corresponding to the oversmoothing rule. It should be noted that such a data point is not ignored because, with high probability, this sample point "represents" many points in $\Omega_C$. Moreover, the penalty for accidentally basing a constraint on an outlier point is small, at least in the context of query optimization.

In general, BHUNT can specify an upper limit on the number of bumps allowed. If this limit is exceeded, then BHUNT greedily merges the closest bump intervals, then the closest bump intervals of those remaining, and so forth.

For real-valued data, it is beneficial to expand the interval widths by a few percent (merging any bumps that overlap after the expansion). Suppose a sample is taken and the right endpoint of the rightmost bump interval is considered, wherein this point corresponds to the maximum value seen in the sample $W_C$. Ideally, the right endpoint should correspond to the maximum value in $\Omega_C$. Typically, the observed maximum value grows as the logarithm of the sample size, so a good deal of additional sampling is required to increase the right endpoint to the correct value. Directly expanding the endpoint slightly achieves the same effect with much less effort. Similar reasoning applies to the other bump-interval endpoints.

Note that for each bump interval the fraction of sample points in $W_C$ that lie within the interval is used as an estimate of the fraction of all points in $\Omega_C$ that lie within the interval. These "selectivities" can be used by the optimizer for purposes of cost estimation. Standard techniques can be used to estimate the precision of the selectivities.

As mentioned previously, BHUNT computes algebraic constraints based on small samples of the data. For a candidate $C=(a_1, a_2, P, \oplus)$, the specific type of sampling depends on the form of the pairing rule P. If P is a trivial rule of the form $\emptyset_R$, BHUNT samples the data by obtaining randomly-selected rows from R. If P is a join predicate between a key-like column $a_1$ in R and a foreign-key-like column $a_2$ in S, then BHUNT samples by obtaining randomly selected rows from S—for each sampled row of S, BHUNT then obtains the matching row of R as determined by P.

Figure 5:
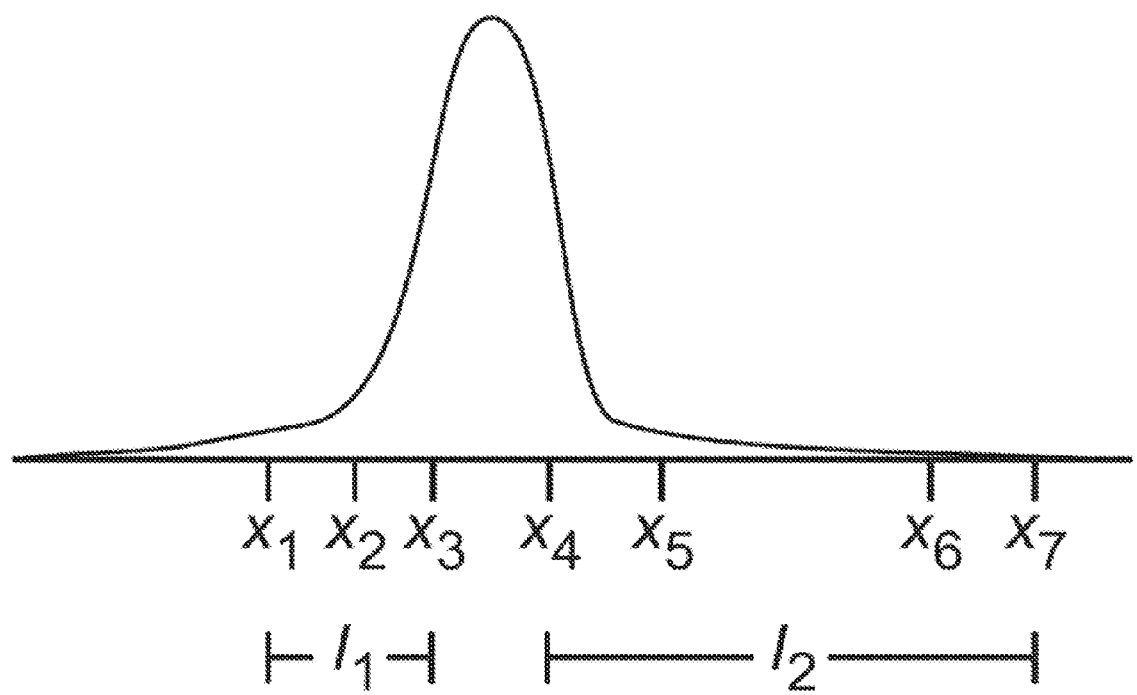
FIG. 5 illustrates a plot depicting a low quality segmentation.

BHUNT tries to choose the sample size so as to control the number of exceptions, and hence the size of the exception tables. Unfortunately, the segmentation methods that BHUNT uses are so complicated that the distribution of the number of exceptions is extremely hard to compute. BHUNT's approach is to compute the target sample size based on the behavior of a "randomized" approximation to the actual segmentation algorithm. This randomized algorithm takes as input parameters a target number of bump intervals k and a sample size n. The randomized algorithm takes a simple random sample of n points from $\Omega_c$ with replacement, and then chooses a k-segmentation randomly and uniformly from among all possible k-segmentations. The idea is that the target sample size for the actual algorithm should be comparable to the ideal sample size for the randomized algorithm. In fact, the latter sample size should be a rough upper bound for the former sample size, because the randomized algorithm is likely to yield somewhat less effective bump intervals. This loss of effectiveness arises because the randomized algorithm will sometimes choose a low quality segmentation such as the one in FIG. 5; for the displayed segmentation, the region around the mode of the true distribution (displayed above the horizontal axis) is not covered by a bump interval.

The distribution of the number of exceptions for the randomized algorithm is given by Theorem 2 below. Recall that the beta distribution with parameters $\alpha$ and $\beta$ is defined by $$\text{Beta}(t; \alpha, \beta) = \frac{\Gamma(\alpha+\beta)}{\Gamma(\alpha)\Gamma(\beta)} \int_0^t u^{\alpha-1}(1-u)^{\beta-1} du,$$

for $t \geq 0$, where $\Gamma$ is the standard gamma function given by $$\Gamma(t) = \int_0^\infty x^{t-1} e^{-x} dx.$$

Theorem 2 Let F be the random fraction of elements of $\Omega_C$ that lie outside of the set of bump intervals $I = I_1 \cup \ldots \cup I_k$ produced by the randomized algorithm from a sample of n data points. Then $$P\{F > x\} \leq \text{Beta}(1-x; n-k, k+1). \tag{6}$$

If the randomized algorithm is used to construct an algebraic constraint having k bump intervals, and it is to be assured that, with probability at least p, the fraction of points in $\Omega_C$ that lie outside the bump intervals is at most f; it follows from Theorem 2 that the constraint should be based on at least n* samples, where n* solves the equation $$\text{Beta}(1-f; n-k, k+1) = 1-p.$$

In the following, this solution is denoted by $n^* = n^*(k)$ to emphasize the dependence on the number of bump intervals. Parameter $n^*(k)$ can be determined (with considerable difficulty) by solving the above equation numerically. Alternatively, Scheffe et al. in their paper entitled, "A formula for sample sizes for population tolerance limits," have developed an approximation to the inverse of the beta distribution which leads to the following approximation for $n^*(k)$:

$$n^*(k) \approx \frac{\chi_{1-p}^2(2-f)}{4f} + \frac{k}{2} \tag{7}$$

Here $\chi_\alpha^2$ is the 100α% percentage point of the $\chi^2$ distribution with 2(k+1) degrees of freedom—this quantity can be quickly and easily computed (e.g., using formulas 26.4.17 and 26.2.23 of the book entitled, "Handbook of Mathematical Functions"). Scheffe and Tukey assert that the error in the approximation is at most 0.1%; however, additional experiments indicate that the maximum error is at most 0.2%, but this degree of accuracy is more than sufficient for the purposes of the present invention.

For the actual segmentation algorithm, $n^*(k)$ is used as the target sample size for creating an algebraic constraint with k bumps. It should be noted that a priori knowledge of the value of k is not known. The fact that $n^*(k)$ is increasing in k, however, suggests the following iterative sample size procedure, given prespecified values of f and p:

1. (Initialization) Set i=1 and k=1.
2. Select a sample size $n=n^*(k)$ as in (7).
3. Obtain the sample and compute an algebraic constraint. Observe the number k' of bump intervals.
4. If $n \geq n^*(k')$ or $i = i_{max}$, then exit; else set k=k' and i=i+1, and go to step 2.

The quantity $i_{max}$ is a parameter of the algorithm. In experiments conducted, the sample size always converged within two or three iterations. The actual algorithm used by BHUNT is slightly more complicated in that it takes NULLs into account: an estimate is maintained of the fraction q of NULL values of $a_1 \oplus a_2$ and the sample size are scaled up by a factor of 1/q.

In many commercial database systems, rows are sampled using a Bernoulli sampling scheme. For row-level Bernoulli sampling at rate p, each row is included in the sample with probability p and excluded with probability 1−p, independently of the other rows. When there are a total of N rows in the table, the resulting sample size is random but equal to Np on average; the standard deviation of the sample size is $(Np(1-p))^{1/2}$. Page-level Bernoulli sampling is similar, except that entire pages of rows are included or excluded. For the low sampling rates typical of BHUNT applications, the Bernoulli sampling schemes behave almost identically to simple random sampling with replacement, so that the foregoing development still applies. In this connection, it should be noted that at first glance there may be cause for concern about the applicability of Theorem 2 when page-level Bernoulli sampling is employed and the data in column $a_2$ is "clustered" on disk, so that there is a strong relationship between the value in column $a_2$ and the page on which the corresponding row is located. In practice, however, the resulting values of $a_1 \oplus a_2$ in $\Omega_C$ are rarely clustered, so that clustering does not pose a real problem to the present invention's methodology.

The present invention's BHUNT implementation uses a conservative procedure to guard against samples that are too small due to Bernoulli fluctuations in the sample size. The idea is to boost the Bernoulli sampling rate so that, under the boosted rate, the target sample size lies three standard deviations below the expected sample size. Thus the probability of seeing a sample size below the target size is very small. If p is the target sampling rate, then the boosted rate is given by $q \approx p + 3(p/N)^{1/2}$, where N is the number of either rows or pages, depending on whether row-level or pagelevel Bernoulli sampling is used, respectively.

For the various reasons outlined above, the sample size procedure tends to be conservative, especially for data with many duplicate values, such as integers or dates. In preliminary experiments, the mean fraction of exceptions was less than or equal to the user-specified fraction in virtually all cases. In the case of discrete data, the target size is reduced by a factor of 5 while still keeping the number of exceptions at or below the target value f.

As discussed previously, the algebraic constraints found by BHUNT can be used in multiple ways, such as (but not limited to): for data mining and for improving query processing performance. In the latter context, for example, the constraints can be passed to a system-configuration tool, so that the DBA receives guidance on how to reconfigure the data, or the system can perform the reconfiguration automatically. Specific focus is directed here on the direct use of discovered constraints by the query optimizer.

In query optimization mode, BHUNT automatically partitions the data into "normal" data and "exception" data. In general, this can be done in a variety of ways, for example by physically partitioning the data or by using partial indexes. In the initial implementation, BHUNT creates exception tables.

The WHERE clause in an SQL statement for creating the exception table contains the predicate (if present) in the pairing rule P, as well as the logical negation of the algebraic constraint predicate. For example, the exception table for the constraint in Example 1 might be specified as shown below:

```
CREATE TABLE exceptions(
     CHAR(3) o-oid, CHAR(3) d-oid,
     DATE o-sdate, DATE d-ddate, TIME d-dtime)
INSERT INTO exceptions AS
(SELECT orders.orderID, deliveries.orderID,
     orders.shipDate, deliveries.deliveryDate,
     deliveries.deliveryTime
FROM orders, deliveries
WHERE orders.orderID = deliveries.orderID
AND NOT (
     (deliveryDate BETWEEN shipDate + 2 DAYS
          AND shipDate + 5 DAYS)
     OR (deliveryDate BETWEEN shipDate + 12 DAYS
          AND shipDate + 19 DAYS)
     OR (deliveryDate BETWEEN shipDate + 31 DAYS
          AND shipDate + 35 DAYS))
)
```

To reduce the costs incurred during optimization and query processing, it may be desirable to maintain a single exception table for all constraints that involve a specified pairing rule P.

Because of resource limitations, it may be necessary to retain only the "most important" constraints when constructing the exception tables. One way to rank the algebraic constraints—especially appropriate when $\oplus$ is the subtraction operator—is to arrange them in decreasing order of (estimated) filtering power as defined previously.

During query processing, each query is modified, if possible, to incorporate the discovered constraints. The modified query is run against the original data, the original query is run against the data in the exception table, and the two sets of results are combined. It should be noted here that the algorithm builds on standard query processing technology.

A prototype implementation of BHUNT against a large database is now described. The database exceeds 2.3Tb in size and a schema similar to the TPC-D schema (as described in Transaction Processing Performance Council's (TPC's) TPC Benchmark D (Decision Support) Standard Specification, Revision 2.1). The largest table had in excess of 13.8 billion rows while the next biggest table had in excess of 3.45 billion rows.

For the test database, which contains 7 years of (synthetic) retail data, the most notable constraints that BHUNT discovered are:

```
lineitems.shipDate BETWEEN orders.orderDate
     AND orders.orderDate + 4 MONTHS
lineitems.received BETWEEN lineitems.shipDate
     AND lineitems.shipDate + 1 MONTH
```

Figure 6:
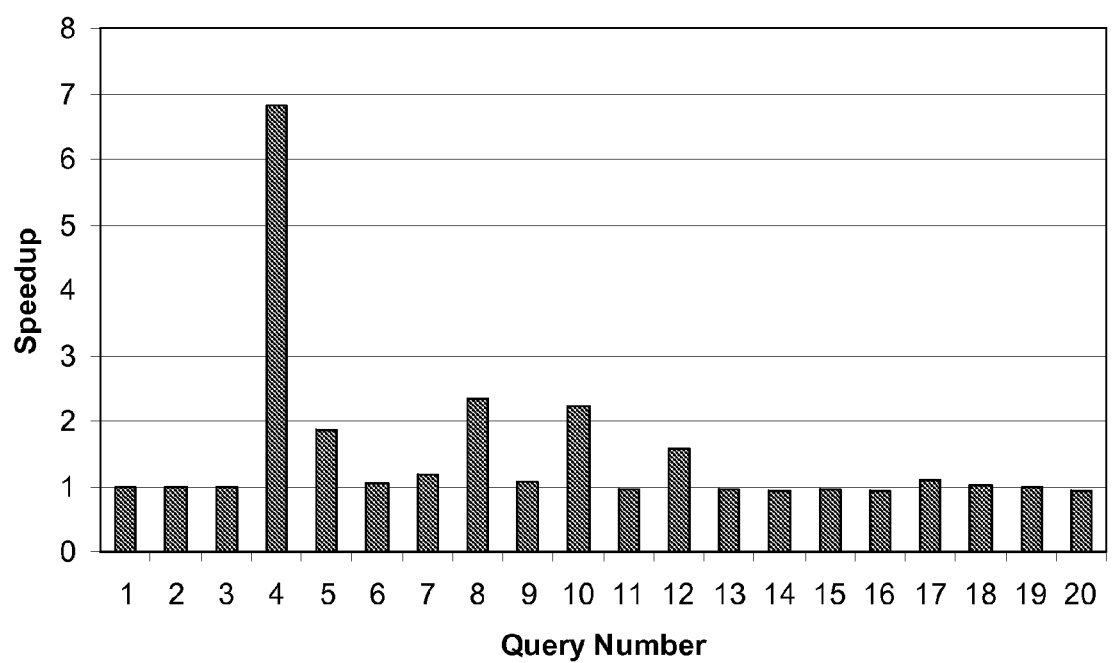
FIG. 6 illustrates the present invention's experimental results via a plot of the query number versus the speedup.

Other constraints are implied by the two above, and none of the discovered constraints were fuzzy. The time to discover the algebraic constraints was approximately 4 minutes. FIG. 6 shows the performance impact of BHUNT on 20 different queries. For each query, FIG. 6 shows the ratio of the elapsed processing time without BHUNT to the elapsed time with BHUNT.

As can be seen, there is a performance improvement for half of the queries, with significant improvements for 25% of the queries. There were no significant performance decreases for any of the queries. The most dramatic speedup—by a factor of 6.83—occurred for Query 4. For this later query, the number of accesses to the large lineitem table were reduced by a factor of about 100.

Hence, the present invention provides for a new data-driven mining technique for discovering fuzzy hidden relationships among the data in a RDBMS. BHUNT provides the discovered relationships in the form of constraint predicates that can be directly used by a query optimizer. In this context, the BHUNT technique can be used to automatically create data structures and modify queries to obtain speedups. Preliminary experiments on a large database show that BHUNT can potentially provide significant performance improvements when processing massive amounts of data; further experimentation is currently in progress.

Additionally, the present invention provides for an article of manufacture comprising computer readable program code contained within implementing one or more modules which can be used to instruct a computer to perform any of the methods associated with the present invention. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) constructing one or more candidates of form $C=(a_1, a_2, P, \oplus)$, wherein $a_1$ and $a_2$ are numerical attributes associated with column values of data in the database, P is a pairing rule, and $\oplus$ is any of the following algebraic operators: +, −, ×, or /; (b) constructing, for each candidate identified in (a), a fuzzy algebraic constraint $AC=(a_1, a_2, P, \oplus, I_1, \ldots, I_k)$ by applying any of, or a combination of the following techniques to a sample of column values: statistical histogramming, segmentation, or clustering, where $I_1, \ldots, I_k$ is a set of disjoint intervals and $k \geq 1$; (c) identifying

19 a set of useful algebraic constraints via heuristics comprising a set of pruning rules; (d) partitioning data into compliant data and exception data; and (e) modify the query to incorporate identified constraints, wherein an optimizer utilizes said identified constraints to identify new and efficient paths.

CONCLUSION

A method has been shown in the above embodiments for the effective implementation of a method for discovering undeclared and fuzzy rules in databases. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in database programming.

The invention claimed is:

1. An article of manufacture having computer readable storage medium comprising computer readable program code which when executed by a computer implements a computer-based method to perform query optimization by automatically finding and exploiting hidden, fuzzy algebraic constraints in a database, said medium comprising:
   (a) computer readable program code constructing one or more candidates of form $C=(a_1, a_2, P, \oplus)$, wherein $a_1$ and $a_2$ are numerical attributes associated with column values of data in said database, P is a pairing rule, and $\oplus$ is any of the following algebraic operators: +, −, ×, or /;
   (b) computer readable program code constructing, for each candidate identified in (a), an algebraic constraint $AC=(a_1, a_2, P, \oplus, I_1, \ldots, I_k)$ by applying any of, or a combination of the following techniques to a sample of column values: statistical histogramming, segmentation, or clustering, where $I_1, \ldots, I_k$ is a set of disjoint intervals and $k \geq 1$,
   (c) computer readable program code performing query optimization using said constructed algebraic constraints and outputting results of said query optimization, and
   wherein one or more pruning rules are used to limit said number of constructed candidates and said pairing rule P represents either a trivial pairing rule $\emptyset_R$ or a join between tables R and S and said pruning rules comprise any of, or a combination of the following:
   pairing rule P is of form R.a=S.b or of the form $\emptyset_R$, and the number of rows in either table R or table S lies below a specified threshold value;
   pairing rule P is of form R.a=S.b with a $\epsilon K$ and the number of distinct values in S.b divided by the number of values in R.a lies below a specified threshold value, wherein K is a set comprising key-like columns among all columns in said database;
   pairing rule P is of form R.a=S.b, and one or both of R and S fails to have an index on any of its columns; or

20 pairing rule P is of form R.a=S.b with a $\epsilon K$, and S.b is a system-generated key.

2. An article of manufacture having computer readable storage medium comprising computer readable program code which when executed by a computer implements a computer-based method for optimizing a query executed on relational data in a database, said medium comprising:
   (a) computer readable program code constructing one or more candidates of form $C=(a_1, a_2, P, \oplus)$, wherein $a_1$ and $a_2$ are numerical attributes associated with column values of data in said database, P is a pairing rule, and $\oplus$ is any of the following algebraic operators: +, −, ×, or /;
   (b) computer readable program code constructing, for each candidate identified in (a), a fuzzy algebraic constraint $AC=(a_1, a_2, P, \oplus, I_1, \ldots, I_k)$ by applying any of, or a combination of the following techniques to a sample of column values: statistical histogramming, segmentation, or clustering, where $I_1, \ldots, I_k$ is a set of disjoint intervals and $k \geq 1$;
   (c) computer readable program code identifying in a set of useful algebraic constraints via heuristics comprising a set of pruning rules;
   (d) computer readable program code partitioning data into compliant data and exception data;
   (e) computer readable program code modifying said query to incorporate identified constraints, wherein an optimizer utilizes said identified constraints to identify new and efficient paths
   (f) computer readable program code outputting said identified new and efficient paths, and
   wherein said pairing rule P represents either a trivial pairing rule $\emptyset_R$ or a join between tables R and S and said pruning rules comprise any of, or a combination of the following:
   pairing rule P is of form R.a=S.b or of the form $\emptyset_R$, and the number of rows in either table R or table S lies below a specified threshold value;
   pairing rule P is of form R.a=S.b with a $\epsilon K$ and the number of distinct values in S.b divided by the number of values in R.a lies below a specified threshold value, wherein K is a set comprising key-like columns among all columns in said database;
   pairing rule P is of form R.a=S.b, and one or both of R and S fails to have an index on any of its columns; or
   pairing rule P is of form R.a=S.b with a $\epsilon K$, and S.b is a system-generated key.

3. An article of manufacture having computer readable storage medium comprising computer readable program code which when executed by a computer implements a method to optimize query processing in a database comprising the steps of:
   (a) computer readable program code identifying candidates of form $C=(a_1, a_2, P, \oplus)$ by finding declared or undeclared key columns and columns related to said declared and undeclared key columns via an inclusion dependency, wherein $a_1$ and $a_2$ are numerical attributes associated with column values of data in said database, P is a pairing rule, and $\oplus$ is an algebraic operator;
   (b) computer readable program code, for each candidate in (a), identifying a sample set and constructing an algebraic constraint $AC=(a_1, a_2, P, \oplus, I_1, \ldots, I_k)$ for said sample set by applying any of, or a combination of the following techniques: statistical histogramming, segmentation, or clustering techniques, wherein the sample size is selected to control the number of exception records that fail to satisfy said algebraic constraint;

(c) computer readable program code identifying a set of useful constraints and associated exception tables via heuristics comprising pruning rules and creating exception tables to hold said exception records; and (d) computer readable program code, during query processing, modifying queries to incorporate said identified algebraic constraints with an optimizer utilizing said identified algebraic constraints and said created exception tables to accelerate query processing.

* * * * *